(12) United States Patent
Lavey et al.

(10) Patent No.: US 9,049,933 B2
(45) Date of Patent: Jun. 9, 2015

(54) SEAT DIVIDER EXTENSION

(71) Applicants: Dana Michele Lavey, Castle Rock, WA (US); Charles Lee Lavey, Castle Rock, WA (US)

(72) Inventors: Dana Michele Lavey, Castle Rock, WA (US); Charles Lee Lavey, Castle Rock, WA (US)

( * ) Notice: Subject to any disclaimer, the term of this patent is extended or adjusted under 35 U.S.C. 154(b) by 0 days.

(21) Appl. No.: 13/850,294

(22) Filed: Mar. 25, 2013

(65) Prior Publication Data

US 2013/0320722 A1  Dec. 5, 2013

Related U.S. Application Data

(60) Provisional application No. 61/615,136, filed on Mar. 23, 2012.

(51) Int. Cl.
*A47C 7/54* (2006.01)
*B60N 2/46* (2006.01)
*A47C 7/02* (2006.01)
*B64D 11/06* (2006.01)

(52) U.S. Cl.
CPC . *A47C 7/02* (2013.01); *B60N 2/468* (2013.01); *B64D 11/0606* (2014.12); *A47C 7/546* (2013.01)

(58) Field of Classification Search
CPC .......... A47C 7/02; A47C 7/546; B60N 2/468; B64D 11/06; B64D 11/0606

USPC ................. 297/464, 463.1, 227, 232, 184.1, 297/411.45, 411.46, 411.23, 248

See application file for complete search history.

(56) References Cited

U.S. PATENT DOCUMENTS

| | | | | |
|---|---|---|---|---|
| 4,118,812 A * | 10/1978 | Pangburn | ........................ | 5/657 |
| 4,858,995 A * | 8/1989 | Young | ...................... | 297/227 X |
| 5,335,962 A * | 8/1994 | Gera | ........................ | 297/232 X |
| 5,429,416 A * | 7/1995 | Lofy | ........................ | 297/411.23 |
| 6,142,574 A * | 11/2000 | Alexander | ..................... | 297/464 |
| 6,644,736 B2 | 11/2003 | Nguyen | | |
| 7,517,023 B2 * | 4/2009 | Kain | .................... | 297/411.29 X |
| 7,568,759 B2 | 8/2009 | Schurg | | |
| 7,641,278 B2 | 1/2010 | Strasser | | |
| 8,201,889 B2 * | 6/2012 | Miranda Montalvo | .... | 297/411.2 X |
| 2012/0074756 A1 * | 3/2012 | Sayre | ..................... | 297/463.1 X |

* cited by examiner

*Primary Examiner* — Anthony D Barfield
(74) *Attorney, Agent, or Firm* — Thomas E. LaGrandeur

(57) ABSTRACT

The present invention relates to a seat divider extension device. The seat divider extension is comprised of two lower, vertically extending portions that are attached to a connecting portion from which the lower portions vertically extend, and an upper, vertically extending portion that is attached to the connecting portion and from which the upper portion vertically extends. The seat divider extension device is configured to be placed over a seat divider positioned between adjacent seats, and thereby extend the personal space of a seat and provide additional privacy for an occupant in a seat.

20 Claims, 4 Drawing Sheets

SEAT DIVIDER EXTENSION

This application claims the benefit of U.S. Provisional Application No. 61/615,136 filed Mar. 23, 2012.

FIELD OF THE INVENTION

The invention relates to a portable seat divider extension that vertically extends an armrest divider which is positioned between two seats.

BACKGROUND OF THE INVENTION

Commercial aircraft, stadiums, arenas, movie theatres, and other multiple seat venues provide stationary seating in which individual seats are in close proximity to one another. Typically, an individual seat is adjacent to at least one seat, as in an aisle configuration, or adjacent to two seats, sitting between two seats, with a seat on each side of the individual seat. In these types of seating configurations, it is common to have a divider separating the seats, with the divider typically having an armrest on top. The armrest divider between the seats is typically configured to be shared between the two individual seats, such that individuals may concurrently place their arms on the armrest, or one of the two seat occupants places his arm on the armrest.

Occupants of adjoining seats having an armrest divider between the seats commonly experience an intrusion of the personal space of their seats. An intrusion of one's personal seat space can occur in many ways, such as an occupant of one seat extending a part or parts of his body into the seat space of an adjacent occupant, or an occupant of one seat extending one or more personal effects into the adjacent seat space, and so on. Current armrest dividers may limit personal space intrusion between seat occupants, but still allow for a significant amount of personal space intrusion to occur between seat occupants. Thus, there remains a need in the art for a portable seat divider extension that provides for greater privacy between seats. The present invention provides such a desirable seat divider extension.

SUMMARY OF THE INVENTION

Provided herein is a seat divider extension devise for extending a seat divider that is positioned between two adjacent seats. The seat divider extension of the present invention extends the barrier a seat divider provides between adjacent seats, and thereby extends the privacy and personal space of an occupant in one of the adjacent seats. The seat divider extension comprises a first lower, vertically extending portion, a connecting portion, a second lower, vertically extending portion, and an upper, vertically extending portion. The two lower vertically extending portions extend below the connecting portion, and the upper vertically extending portion extends above the connecting portion. In this configuration, a seat divider extension of the present invention is designed to be positioned over a seat divider, such that the lower vertically extending portions face the seat divider and grasp or clamp it, the connecting portion is positioned over the armrest or horizontal surface of the seat divider, and the upper vertically extending portion extends above the connecting portion between the adjacent seats. The seat divider extension thereby functions to extend the division of space between two adjacent seats.

In a preferred embodiment, a seat divider extension is provided for extending the personal space for an occupant of an airplane seat.

DETAILED DESCRIPTION OF THE INVENTION

Figure 1:
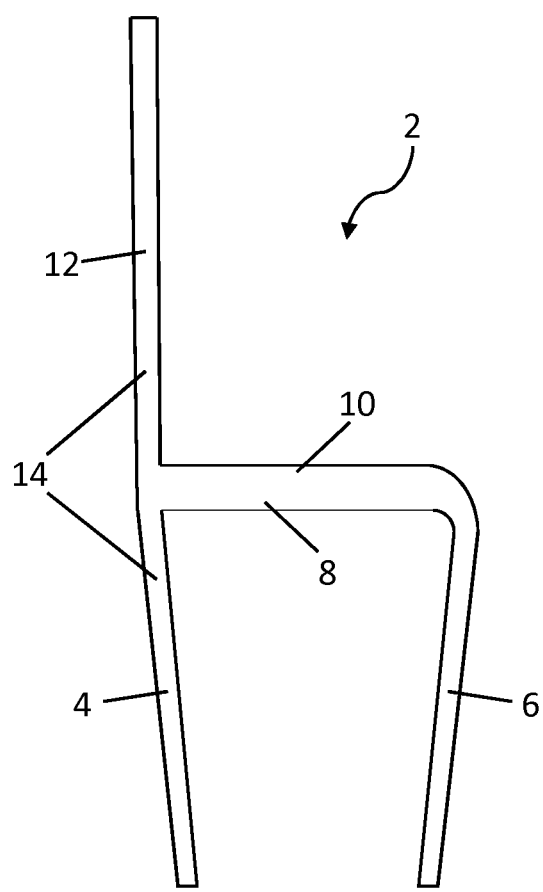
FIG. 1 shows a side view of a seat divider extension.

The present invention relates to a seat divider extension device. In particular, the invention provides a convenient and aesthetic device for vertically extending an armrest divider that divides adjacent seats. In this regard, the seat divider extension of the present invention allows a user to limit intrusion of personal space from an occupant in an adjacent seat.

As used herein, the terminology "seat divider extension" refers to a device that vertically extends the division of space created by a seat divider that sits between two adjacent seats. The term "seat divider" refers to any type of device or composition of matter that is positioned between two adjacent seats to help define the space occupied by each seat (that is, the personal space of a seat's occupant), and to provide privacy of space that lies between a seat divider on one side of the seat and a seat divider, wall, or other barrier that lies on the other side of the seat. A seat divider typically has a vertical orientation, such that it is vertical, upright, or perpendicular to the horizontal orientation of the seat or sitting or bench portion of a seat, i.e., the portion of a seat on which an occupant sits. Typically, a seat divider is covered on its uppermost surface with an armrest. Such a seat divider is referred to herein as an "armrest seat divider." While the term "seat divider extension" or "seat divider extension device" is used herein, one of skill in the art will understand that this terminology generally refers to any type of device or composition of matter that can serve the purpose of vertically extending the division of space created by a seat divider. A seat divider extension thereby is used to extend the division of space between seats such that each seated occupant is able to enjoy privacy from adjacent or adjoining occupants. The term "occupant" is synonymous with any terminology that refers to a person who would be seated in a seat, such as, but not limited to, "person," "passenger," "traveler," "spectator," and the like.

A seat divider extension according to the present invention may be any configuration that effectively extends, in a vertical direction, the division of space created by a seat divider. A seat divider extension as presented herein will typically have a configuration such that the seat divider extension will sit over a seat divider. The seat divider extension will have two lower, vertically extending portions that are approximately parallel to the vertical sides of a seat divider and that will face opposite sides of a seat divider, such that one lower, vertically extended portion will outwardly face one seat on one side of a seat divider, and the other lower, vertically extended portion will outwardly face the adjacent seat on the opposite of a seat divider. The lower, vertically extending portions will be connected by a connecting portion that is fashioned to sit over the horizontal top of a seat divider. Typically, the horizontal top of a seat divider will comprise an armrest. The connecting portion will thereby be positioned directly over an armrest or horizontal surface of a seat divider. Finally, the seat divider extension will have an upper, vertically extending portion that is approximately parallel to the vertical orientation of a seat divider, as defined by the center of the seat divider or its vertical side(s). A seat divider of the present invention will therefore be comprised of a two lower, vertically extending portions, with each portion configured to sit on opposite sides of a seat divider and to extend below a connection portion, a connecting portion that connects the two lower, vertically extending portions, and an upper, vertically extending portion that extends above the connection portion.

The connecting portion that connects the two lower, vertically extending portions may take the form of any configuration that allows the seat divider extension to be placed over a seat divider. The connecting portion may be a flat, horizontal panel, or can be any shape that can be adapted to be placed over a seat divider. Such shapes include, but are not limited to, a flat plane, a curve, an angular shape (triangular, rectangular, etc.), trapezoid, parallelogram, and so on. The connection portion may or may not directly contact the seat divider armrest or horizontal surface. In a preferred embodiment, the connection portion will contact the seat divider armrest or horizontal surface. In this regard, the connection portion may rest on the seat divider armrest or horizontal surface, thereby helping to lend stability and support to the seat divider extension.

A seat divider extension of the present invention may take any form, configuration or shape that allows for the two lower, vertically extending portions, the connecting portion, and the upper, vertically extending portion. For example, the portions may be formed from, but not limited to, various shapes and configurations formed from panels, partial panels, arm or finger like extensions, etc., and any combination of such various shapes and configurations. For instance, a given embodiment might have lower, vertically extending portions that are arm-like projections that extend from a connecting panel, with an upper, vertical panel that extends the space division created by a seat divider. The various shapes encompassed by the portions may be any that create a functional seat divider extension. For example, such shapes include, but are not limited to, rectangles, squares, circular shapes (crescent, half circle, etc.), angular shapes (triangle, trapezoid, parallelogram, etc.), and the like.

In a preferred embodiment, a seat divider of the present invention will have two lower, vertically extending portions that are angled inward toward a seat divider. In this regard, the lower, vertically extending portions may be tapered in toward a seat divider so that the lower portions effectively grasp or clamp the seat divider extension to the seat divider. This tapered configuration of lower, vertically extending portions allows the seat divider extension to be held in place over the seat divider and stabilizes the position of the seat divider extension. The configuration of the lower, vertically extending portions can be of any shape that promotes contact between the portions and the sides of a seat divider so as to provide stability to the seat divider extension and to secure the position of the seat divider extension over the seat divider. As described herein, a preferred embodiment is a tapered shape of the lower, vertically extending portions, such that the taper allows the portions to grasp or clamp to the sides of a seat divider. However, any shape that allows the lower, vertically extending portions to grasp of clamp to the sides of a seat divider may be used. For example, the lower, vertically extending portions of the seat divider extension might contain a rolled lower edge or additional material that allows a portion of the lower, vertically extending portions of the seat divider extension to exert pressure on the seat divider and thereby secure the seat extension divider in place.

A seat divider extension of the present invention may have a rigid overall configuration, such that the seat divider extension maintains its shape when not in use and is ready for positioning over a seat divider. Alternatively, a seat divider extension of the present invention may be collapsible, such that it can be folded flat or nearly so when not in use. In this regard, a seat divider extension may be hinged between different portions, so that the different portions can be folded upon each other when not in use. For example, one example of a potentially hinged configuration may have two lower, vertically extended rectangular panels attached to a flat rectangular connecting portion panel, to which is also attached an upper, vertically extended rectangular panel. In this example, each of the lower, vertically extended rectangular panels could be attached to the connecting panel by hinges. Likewise, the upper, vertically extended rectangular panel could be attached to the connecting panel by a hinge. In use, the vertical panels would be hinged out from the connecting panel, so that the connecting panel would be in a horizontal position and the other panels in their respective lower and upper extending vertical positions. When not in use, this configuration could be folded along the hinges, so that all of the panels lie flat, either against each other in multiple flat planes or extended in one or more flat planes. The hinge could be made of a separate hinge material or could be a flexible, bendable portion of the same material used to make the panels of the seat divider extension.

A seat divider extension of the present invention can be constructed from any of a number of materials. The seat divider extension can be made of a solid material, such that entire portions of the seat divider extension are made from that material. For example, a seat divider extension can be made of a plastic polymer, such that an entire portion of or an entire seat divider extension is made of the material, such that the faces of the seat divider extension and interior of the extension are the same, contiguous material. In a preferred embodiment, the seat divider extension is made of a flexible material, such as a plastic, so that it the lower, vertically extending portions can be flexed apart to allow the seat divider extension to be placed over a seat divider. Alternatively, a seat divider extension can be made of an interior material that is subsequently covered with a covering material, such as a cloth, fabric, vinyl, leather and so on. In addition, an interior material can be covered with layers, such as a first layer that provides padding or a soft material, and a second layer of an exterior material, such as a cloth, fabric, vinyl, leather, and so on. A seat divider extension can accordingly be made from a variety of materials, including, but not limited, plastic, resin, various polymers, wood, metal, and so forth. In a preferred embodiment, the invention is made from a polymeric plastic, such as, but not limited to, polypropylene. In using various materials, a seat divider extension of the present invention may have any of a number of exterior colors and/or patterns, be it one or more solid colors, a combination of various colors, a pattern of various colors and designs, and so forth.

A seat divider extension of the present invention may have any of a number of configurations and dimensions as required or desired to fit over a particular type of seat divider. For example, in a preferred embodiment, a seat divider extension of the present invention will be configured and have dimensions appropriate for use in a commercial airplane. Thus, this embodiment will be wide enough to fit over a commercial airplane seat divider, and have appropriate dimensions with respect to the vertically extending portions to provide stability to the seat divider extension and to secure the position of the seat divider extension over the seat divider.

Figure 2:
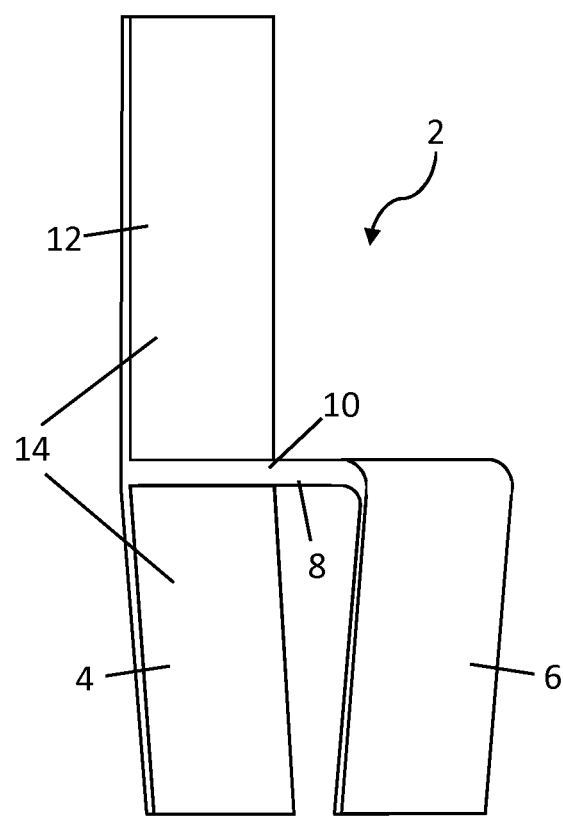
FIG. 2 shows a front perspective view of a seat divider extension.

A preferred embodiment of a seat divider extension of the present invention is shown in FIGS. 1 and 2. In this embodiment 2, a solid, contiguous configuration of a seat divider extension is made from a single material, such as polypropylene or a similar elastomeric polymer. As shown in FIGS. 1 and 2, this embodiment has two lower, vertically extending portions or panels 4 and 6 that are attached to a connecting portion or panel 8 that has a horizontal configuration. The connecting panel 8 has a thicker, padded portion 10 that is made of a softer, elastomeric material. Finally, the seat divider extension has an upper, vertically extending portion or panel 12. As shown in FIGS. 1 and 2, the upper, vertically extending portion 12 can be configured to be contiguous with a lower, vertically extending portion 4, such that the two portions form a contiguous panel 14 that comprises portions 4 and 12.

Figure 3:
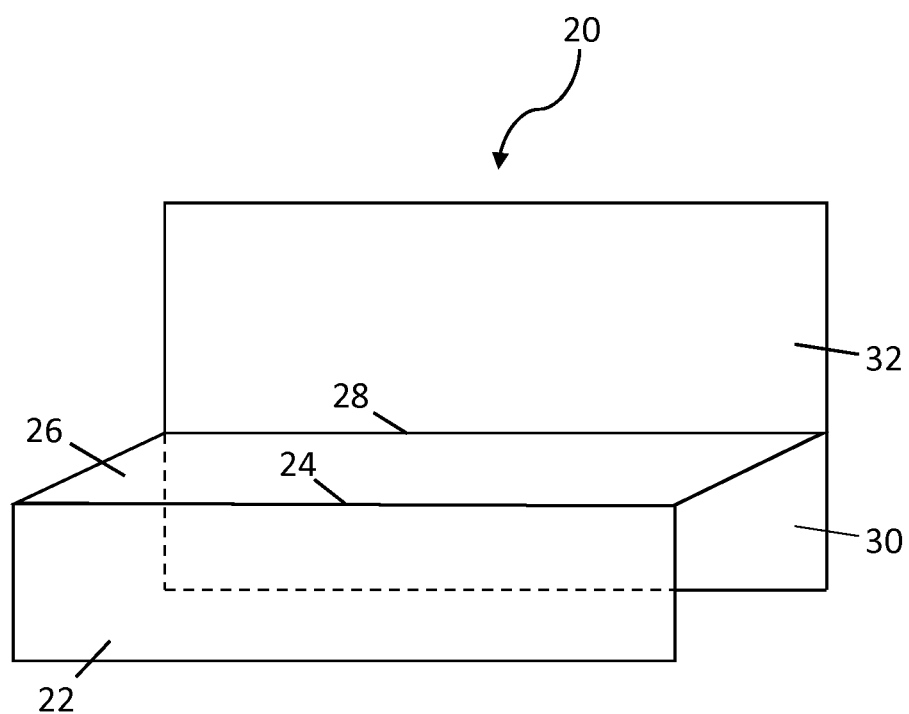
FIG. 3 shows a front perspective view of a seat divider extension.
Figure 4:
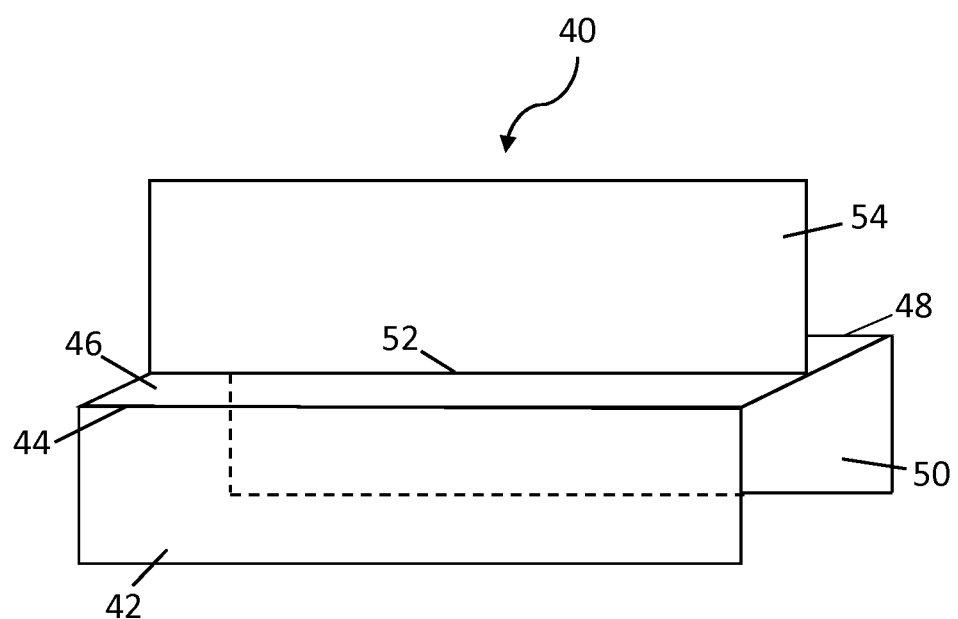
FIG. 4 shows a front perspective view of a seat divider extension.

Alternative embodiments 20 and 40 of a seat divider of the present invention are respectively shown in FIGS. 3 and 4. In these embodiments, the various panels are hinged together, such that these embodiments can be folded flat when not in use. For example, embodiment 20 shown in FIG. 3 has lower, vertically extending panels 22 and 30 that are attached to connecting, horizontal panel 26, and upper, vertically extending panel 32. Lower panels 22 and 30 are attached to panel 26 by hinged portions 24 and 28, respectively. Upper panel 32 is likewise attached to panel 26 by hinged portion 28. The rendering of the embodiment in FIG. 3 depicts essentially flat panels, such that the hinged portion 28 connects both the lower panel 30 and the upper panel 32. In actual use, the hinged portion 28 would likely comprise two hinged portions, one for the lower panel 30 and one for the upper panel 32.

FIG. 4 shows an embodiment 40 that is similar to embodiment 20 shown in FIG. 3, with the main difference between the two embodiments being the position of the upper, vertically extending panel. In the embodiment 20, the upper panel is shown as mounted or attached on one side of the horizontal panel 26. In the embodiment 40, the upper panel 54 is shown as mounted or attached in the middle of the horizontal panel 46. Thus, the embodiment shown in FIG. 4 comprises lower vertical panel 42 attached to horizontal panel 46 by hinged portion 44; lower vertical panel 50 attached to horizontal panel 46 by hinged portion 48; and upper vertical panel 54 attached to horizontal panel 46 by hinged portion 52.

While the present invention has been described as having particular configurations disclosed herein, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The following example illustrates certain aspects of the invention, but is not intended to limit in any manner the scope of the invention.

Example I

A Seat Divider Extension for Use in an Airplane

An example of a seat divider extension of the present invention is shown in FIGS. 1 and 2. This particular example is configured to fit as a seat divider extension to be used to extend a seat divider in a commercial airplane. The general configuration of this embodiment is as described above, in which a solid, contiguous configuration of a seat divider extension 2 is made from polypropylene. As shown in FIGS. 1 and 2, this embodiment has two lower, vertically extending portions or panels 4 and 6 that are attached to a connecting portion or panel 8 that has a horizontal configuration. The connecting panel 8 has a thicker, padded portion 10. Finally, the seat divider extension has an upper, vertically extending portion or panel 12. As shown in FIGS. 1 and 2, the upper, vertically extending portion 12 can be configured to be contiguous with a lower, vertically extending portion 4, such that the two portions form a contiguous panel 14 that comprises portions 4 and 12. In this particular example, each of the vertically extending panels are made of a polypropylene that is approximately 0.125 inches thick. The horizontal panel 8 is approximately 4.6 inches wide (distance between inner portions of panels 4 and 6). The lower panels 4 and 6 extend approximately 5 inches below horizontal panel 8, and upper panel 12 extends approximately 7.4 inches above horizontal panel 8. The horizontal panel 8 is covered with a soft elastomeric polymer material 10 that provides a comfortable armrest portion to the seat divider extension.

I claim:

1. A seat divider extension comprising a first lower, vertically extending flat panel, a second lower, vertically extending flat panel, a connecting horizontal, rectangular flat panel to which the first and second lower, vertically extending panels are attached to opposite, parallel lengthwise sides of the rectangular connecting panel and extend below the connecting panel to form a clamp structure having a continuous open gap between the lower vertically extending panels and below the connecting panel, wherein each of opposing, inward facing inner portions of the lower vertically extending panels provide a clamping surface to contact vertical sides of the seat divider and the connecting panel provides a downward facing surface to rest on an upward facing, horizontal surface of the seat divider;

and an upper, vertically extending flat panel which extends above and is perpendicularly attached to a lengthwise side of the rectangular connecting panel, is parallel to a vertical orientation of the seat divider, and is contiguous with the first lower, vertically extending panel.

2. The seat divider extension of claim 1, in which the lower, vertically extending panels of the clamp structure are angled inward in a tapered configuration.

3. The seat divider extension of claim 1, the connecting panel further comprising a padded, upward facing armrest portion.

4. The seat divider extension of claim 1, in which the panels are formed as a solid, contiguous configuration of a same material.

5. The seat divider extension of claim 4, in which the material is a polymeric plastic.

6. The seat divider extension of claim 4, in which the material is polypropylene.

7. The seat divider extension of claim 1, in which the lower, vertically extending panels provide a clamping surface to contact vertical sides of a seat divider in a commercial airplane, and the connecting panel provides a downward facing surface to rest on an upward facing, horizontal surface of a seat divider in a commercial airplane.

8. The seat divider extension of claim 7, in which the lower, vertically extending panels of the clamp structure are angled inward in a tapered configuration.

9. The seat divider extension of claim 7, in which the connecting panel provides a downward facing surface to rest on an upward facing, armrest of a seat divider in a commercial airplane.

10. The seat divider extension of claim 7, in which the lower, vertically extending panels are angled inward in a tapered configuration, and the connection panel provides a downward facing surface to rest on an upward facing, armrest of a seat divider in a commercial airplane.

11. The seat divider extension of claim 10, in which the connection panel further comprises a padded, upward facing armrest portion.

12. The seat divider extension of claim 10, in which each of the panels are formed of rectangular flat panels.

13. The seat divider extension of claim 10, in which the panels are formed as a solid, contiguous configuration of a same material.

14. The seat divider extension of claim 13, in which the material is a polymeric plastic.

15. The seat divider extension of claim 13, in which the material is polypropylene.

16. The seat divider extension of claim 10, in which the lower, vertically extending panels are formed of a flexible material.

17. The seat divider extension of claim 16, in which the flexible material is a polymeric plastic.

18. The seat divider extension of claim 16, in which the flexible material is polypropylene.

19. The seat divider extension of claim 1, in which the lower, vertically extending panels are angled inward in a tapered configuration, and the connection panel further comprises a padded, upward facing armrest portion.

20. A commercial airplane seat divider extension comprising a first lower, vertically extending flat panel, a second lower, vertically extending flat panel, a connecting, horizontal, rectangular flat panel to which the first and second lower, vertically extending panels are attached to opposite, parallel lengthwise sides of the rectangular connecting panel and extend below the connecting panel to form a clamp structure having a continuous open gap between the lower vertically extending panels and below the connecting panel, wherein each of opposing, inward facing inner portions of the lower vertically extending panels provide a clamping surface to contact vertical sides of the commercial airplane seat divider and the connecting panel provides a downward facing surface to rest on an upward facing, armrest of the commercial airplane seat divider;

and an upper, vertically extending flat panel which extends above and is perpendicularly attached to a lengthwise side of the rectangular connecting panel, is parallel to a vertical orientation of the seat divider, and is contiguous with the first lower, vertically extending panel;

the lower vertically extending panels are angled inward in a tapered configuration, and the connecting panel further comprising a padded, upward facing armrest portion.

* * * * *